July 20, 1965  R. L. BIENVENUE ETAL  3,195,582

COIL SHAPING APPARATUS

Filed Sept. 29, 1961  6 Sheets-Sheet 1

ROLAND L. BIENVENUE
JOHN J. CHADDERTON
DONALD K. VOYCE
INVENTORS

BY *Joseph C. Ryan*

ATTORNEY

July 20, 1965  R. L. BIENVENUE ETAL  3,195,582
COIL SHAPING APPARATUS
Filed Sept. 29, 1961  6 Sheets-Sheet 2

ROLAND L. BIENVENUE
JOHN J. CHADDERTON
DONALD K. VOYCE
INVENTORS
BY Joseph C. Ryan
ATTORNEY

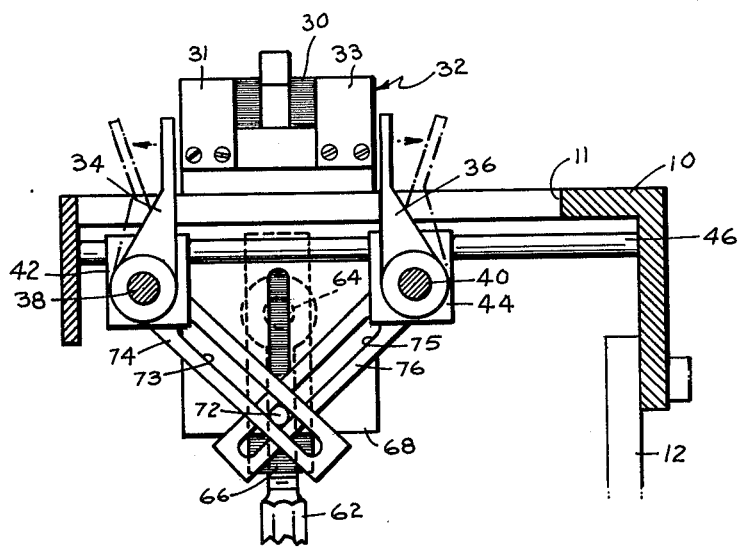
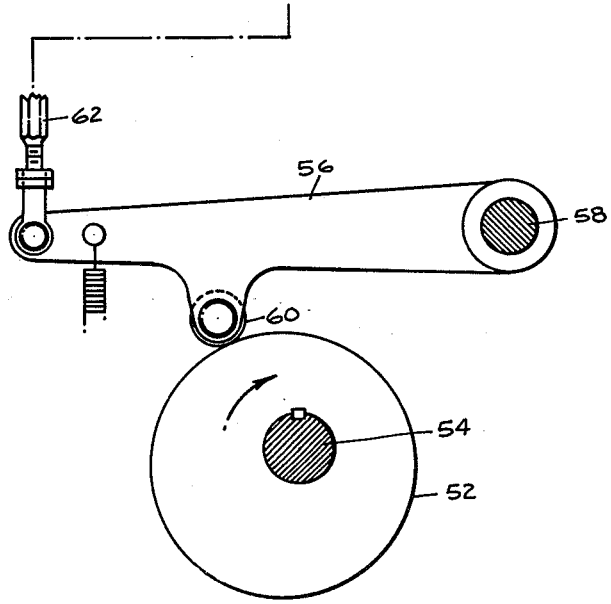
fig-3
ROLAND L. BIENVENUE
JOHN J. CHADDERTON
DONALD K. VOYCE
INVENTORS
BY *Joseph C. Ryan*
ATTORNEY

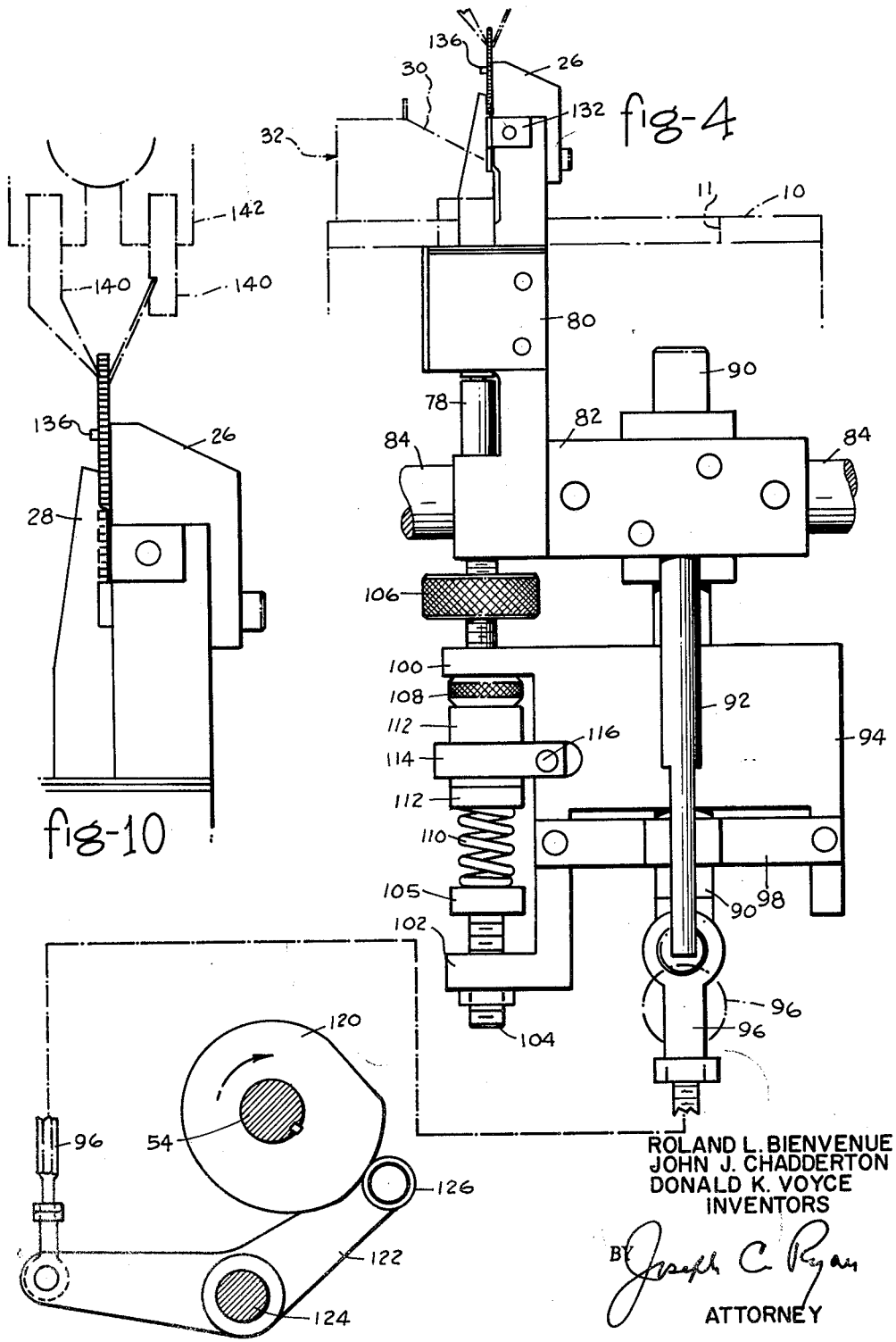

July 20, 1965   R. L. BIENVENUE ETAL   3,195,582
COIL SHAPING APPARATUS
Filed Sept. 29, 1961   6 Sheets-Sheet 5
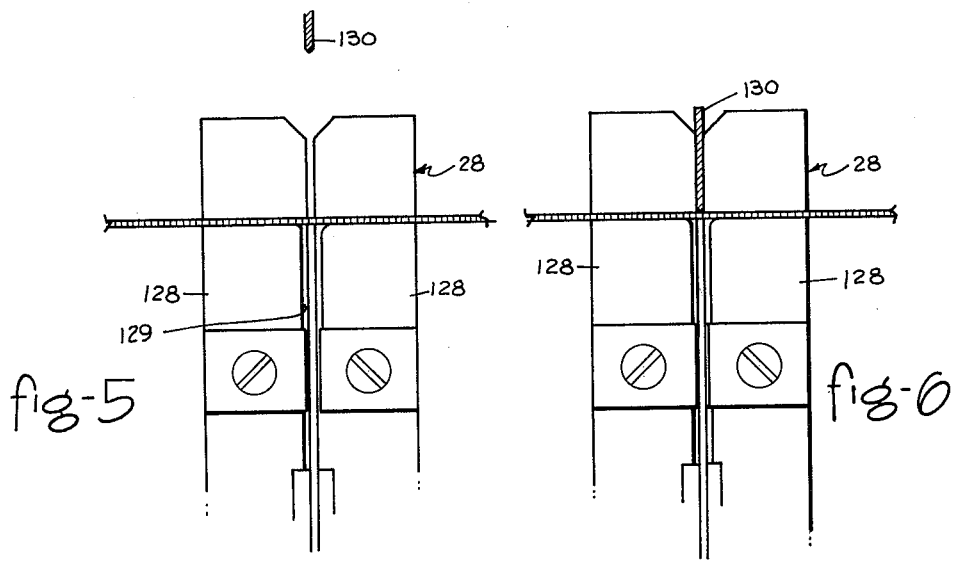
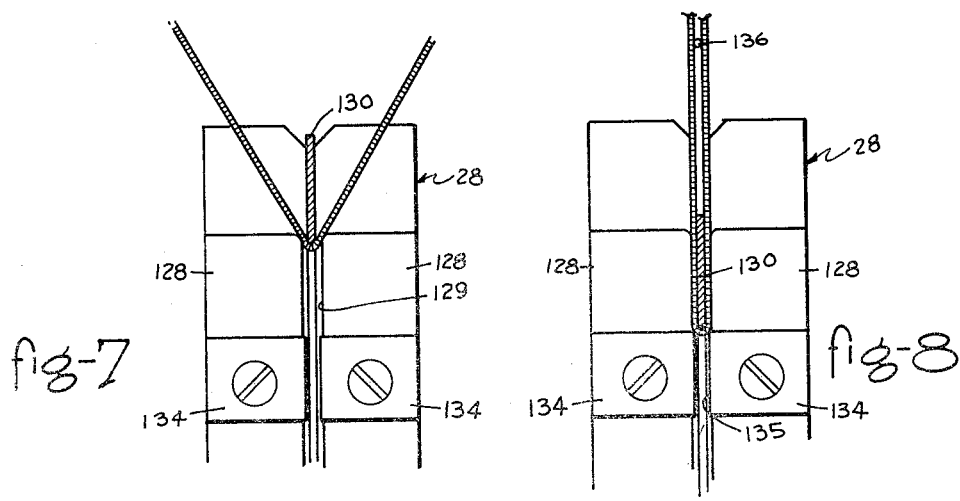
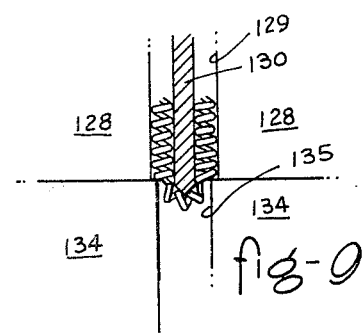
ROLAND L. BIENVENUE
JOHN J. CHADDERTON
DONALD K. VOYCE
INVENTORS

ROLAND L. BIENVENUE
JOHN J. CHADDERTON
DONALD K. VOYCE
INVENTORS

BY Joseph C. Ryan
ATTORNEY

United States Patent Office 3,195,582
Patented July 20, 1965

3,195,582
COIL SHAPING APPARATUS
Roland L. Bienvenue, Lawrence, John J. Chadderton, Lynn, and Donald K. Voyce, Peabody, Mass., assignors to Sylvania Electric Products Inc., a corporation of Delaware
Filed Sept. 29, 1961, Ser. No. 141,659
4 Claims. (Cl. 140—71.5)

This invention relates to wire working and more particularly to the shaping of segments of coiled wire such as heater coils which comprise one of the components in electron tubes and alike.

One type of coil which is used extensively in the manufacture of electron tubes is the so-called hairpin heater coil. Over the years, considerable difficulty has been encountered in attempting to provide suitable automatic apparatus for shaping a segment of coiled wire to a hairpin configuration. For the most part, this hairpin forming operation has been performed manually or semi-automatically with suitable jigs or other bench-type devices. These techniques have long been recognized as both expensive and time consuming. Because these operations were not fully automatic, the coils were handled several times and this circumstance contributed substantially to lack of uniformity of the finished article and an excessively high degree of inferior quality coils.

Heretofore it has been the general practice in the industry to wind a continuous length of wire on a mandrel to define a continuous coiling and then cut the continuous coiling to define individual coils. These operations are usually performed on automatic equipment. However, thereafter these individual coils are then folded into hairpin shape by operators with or without the benefit of a suitable jig or manually operated forming fixture. A mass of these coils so shaped is then immersed in a suitable bath to etch out the mandrel. An operator must then disentangle the coils from one another and then manually feed them individually into a suitable transfer device which feeds the coils into a coating machine.

It is readily apparent from the foregoing that several of these operations are time consuming and not conducive to integration into a line of automatic equipment.

In view of the foregoing, the principal object of this invention is to form hairpin coils automatically.

Another object of this invention is to provide automatic equipment for the shaping of coils into hairpin configuration.

A further object of this invention is to provide automatic coil shaping apparatus readily adaptable to integration into a line of fully automatic equipment.

These and other objects, advantages and features are obtained, in accordance with the principles of our invention, by providing a reciprocating die which operates in cooperation with an anvil to effect the shaping of a segment of coiled wire into hairpin configuration. A segment of coiled wire is fed automatically into a suitable receiving member and the coiled wire is automatically centered on the wire receiving member. Immediately thereafter, the oriented coil is removed from the wire receiving member by the die and is then shaped on the anvil. As soon as the coil has been shaped into hairpin configuration by the die, the free ends thereof are gripped by a suitable transfer device, the die and the anvil are displaced from the shaped coil and the aforesaid transfer device then carries the shaped coil to a coating station.

It will be readily apparent to those skilled in the art that the apparatus of this invention makes possible the elimination of several of the manual operations heretofore employed as described above. The apparatus of this invention may be readily integrated into a line of automatic equipment in which coils from which the mandrels having already been removed are automatically fed one at a time to a suitable automatic transfer device such as the transfer apparatus shown and described in the co-pending application of J. W. Wallace et al., Serial No. 98,466, filed March 27, 1961, entitled "Article Pick-up and Transfer Method and Apparatus," now Patent No. 3,097,753, assigned to the same assignee as this invention.

In a specific embodiment of the invention illustrated in the accompanying drawings:

FIG. 3 is a cross-sectional detail taken along the line 3—3 of FIG. 2 showing the coil centering mechanism and its associated drive.

FIG. 4 is an enlarged elevational view of the die-anvil assembly illustrating particularly the means employed to effect reciprocation of the die on the anvil.

FIGS. 5-8 are fragmentary details of the die on an enlarged scale illustrating the sequence of the coil shaping operations.

FIG. 9 is an enlarged fragmentary detail of a portion of FIG. 8 illustrating particularly the shape of the coil and the bight thereof.

FIG. 10 is an enlarged elevational detail showing the formed coil in the die-anvil assembly with the legs of the coil gripped by a suitable transfer device for withdrawal.

Figure 1:
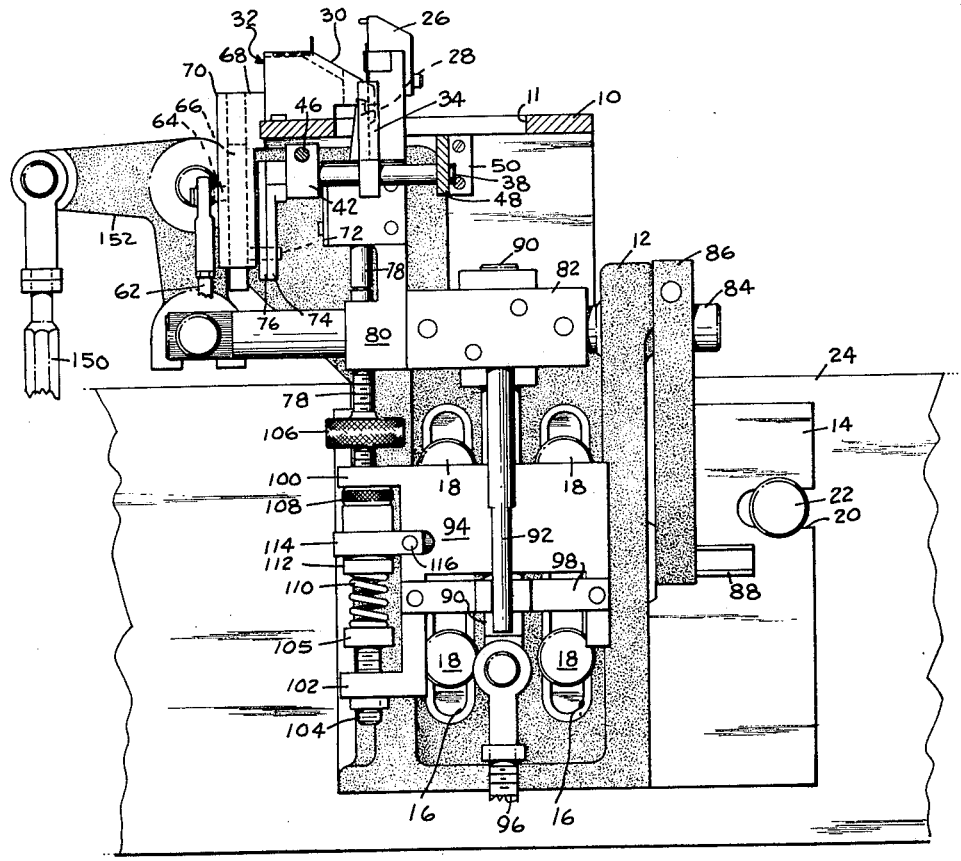
FIG. 1 is a front elevational view of the coil forming apparatus.
Figure 2:
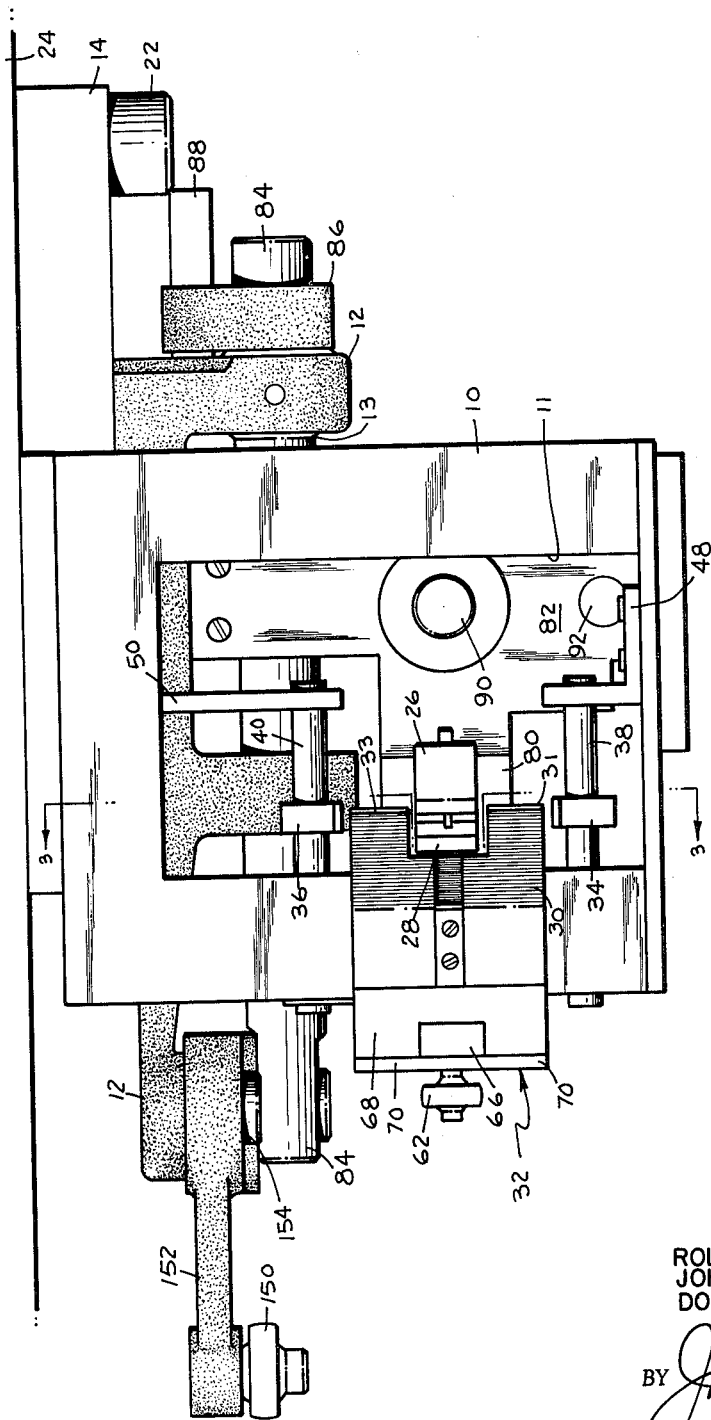
FIG. 2 is a plane view of the apparatus of FIG. 1.

Referring now to the drawings, in which a specific embodiment of the apparatus of this invention is illustrated, and more particularly to FIGS. 1 and 2 thereof, the basic support members comprise a table 10 mounted on a bracket 12 attached to a mounting plate 14. The bracket 12 is provided with a pair of elongated slots 16 through which mounting screws 18 extend, thus providing for vertical adjustability of the bracket 12 on the mounting plate 14. The mounting plate 14 is similarly provided with slots 20, one of which is shown, through which mounting screws 22 extend, thus providing for horizontal adjustability of the mounting plate 14 on a rail 24. The rail 24 is a basic structural component of the frame of a machine with which the apparatus of this invention may be associated, such as the machine illustrated in U.S. Patent 2,637,144 which issued on May 3, 1953 to R. M. Gardner et al. for example.

The table 10 is provided with a relatively large opening 11 therein, through which the two basic working tools which actually shape the coil extend. These working tools are an anvil 26 and a die 28. Coils are fed, one at a time, by a suitable coil feeding device which drops the coils on the inclined face 30 of a coil guiding slide 32, the coils then rolling down the inclined face 30 and coming to rest against a pair of coil stops 31 and 33 attached to the front face of the slide 32 as shown particularly in FIGS. 2 and 3. The coil guiding slide 32 is mounted on table 10.

After a coil has been fed to the slide 32, its lateral disposition thereon is adjusted before the coil shaping operations are initiated. This coil positioning device comprises a pair of fingers 34 and 36 located astride the slide 32 and mounted on finger shafts 38 and 40 respectively. The finger shafts 38 and 40 are supported at one end thereof by, and rotatable within bearing blocks 42 and 44 respectively as shown particularly in FIGURE 3. The bearing blocks 42 and 44 are mounted on a rod 46 which is supported at its ends in the depending sides of table 10. The other ends of the finger shafts 38 and 40 are supported in brackets 48 and 50 attached to table 10.

Actuation of the fingers 34 and 36, to adjust the lateral dispositin of a coil resting on the inclined face 30 of the slide 32 and contained by the stops 31 and 33 thereof, is effected by a coil positioning cam 52 on a drive shaft 54 as shown in FIG. 3. A rocker arm 56 is supported at one end thereof on a rocker arm shaft 58. A cam follower 60 is supported on rocker arm 56 intermediate the ends thereof and rides on cam 52. One end of a connecting rod 62 is attached to the other end of rocker arm 56. The other end of connecting rod 62 is provided with a laterally extending pin 64 which extends into a face of slide 66. The slide 66 is disposed between and slidable within a supporting block 68 mounted on table 10 and a cover-plate 70 attached to the supporting block 68 (FIG. 1). The other face of slide 66 has a laterally extending pin 72 projecting therefrom which extends through elongated slots 73 and 75 in links 74 and 76 respectively. The links 74 and 76 are attached at one end thereof to finger shafts 38 and 40 respectively.

The contour of the coil positioning cam 52 is such that it effects reciprocation of the connecting rod 62 in a vertical plane. This reciprocation of connecting rod 62 effects reciprocation of slide 66 to which it is connected by pin 64. Reciprocation of slide 66 effects displacement of the pin 72 projecting therefrom and thus operates the links 74 and 76, through the slots 73 and 75 of which the pin 72 extends. The links 74 and 76, in turn, rotate the finger shafts 38 and 40 to which they are attached and thus alternately displace the fingers 34 and 36 from their rest positions as shown in phantom to their coil centering positions as shown in solid in FIG. 3.

After a coil has been centered as just described and the fingers 34 and 36 have returned to their normal rest position, the die 28 is advanced upwardly and lifts the coil off of the inclined face 30 of the slide 32. This is the start of the actual coil forming operation. As noted above the die 28 and the anvil 26 are disposed in cooperative relationship with respect to one another with the former being reciprocatively disposed on the latter. The die 28 is mounted on the top end of a vertically disposed die rod 78. The anvil 26 is mounted on the top of an anvil support 80. The die rod 78 is supported by and is reciprocative within the anvil support 80. A block 82, attached to and formed integral with anvil support 80, extends laterally from the lower end of the anvil support 80.

The block 82 is provided with two vertical bores and a horizontal bore, each extending therethrough. An anvil displacement rod 84, the purpose of which will be described more fully below, extends through block 82 and is pinned thereto. This anvil displacement rod 84, as illustrated particularly in FIGS. 1 and 2, extends through and is reciprocative within bracket 12 and has a stop arm 86 attached to and depending therefrom. The lower end of the stop arm 86 rides on and is guided by a pin 88 projecting laterally from the bracket 12. A shaft 90 and a guide rod 92 extend through the vertical bores of the block 82, the shaft 90 being reciprocative therein and the guide rod 92 being fixed thereto. The shaft 90 extends through a die lifting block 94 and is secured thereto, the lower end of the shaft 90 being connected to the upper end of a connecting rod 96. The lower end of guide rod 92 rides in a slot provided therefor in a plate 98 attached to block 94. The block 94 is provided with a pair of spaced laterally projecting ears 100 and 102. The die rod 78 extends through and is reciprocative within the ear 100. An adjustable stop in the form of a screw 104 is threaded in the ear 102. As may be noted in FIGS. 1 and 4, a portion of the die rod 78 is threaded and is provided with knurled nuts 106 and 108, the former being disposed above the ear 100 and the later being disposed below it. The relative disposition of both of these nuts 106 and 108 on the die rod 78 may thus be adjusted. Adjustment of nut 106 is effected to set the effective length of the stroke of the die rod 78 insofar as the die 28 is concerned. Adjustment of nut 108 is effected to establish a desired load on a spring 110 which cooperates with the adjustable stop screw 104. Spring 110 is supported by and is disposed between had 105 of screw 104 and sleeve 112 disposed on the lower end of die rod 78. Sleeve 112 is supported by and secured to a clamp coller 114 which is pinned at 116 to die lifting block 94.

The means employed to effect reciprocation of the die 28 on the anvil 26 to form the coil will now be described, reference being made particularly to FIG. 4. The die rod 78, on the top of which the die 28 is mounted, is reciprocated by a die cam 120 mounted on drive shaft 54. A rocker arm 122, mounted intermediate its ends on rocker arm shaft 124, is provided at one end thereof with a cam roller 126 which rides on cam 120. One end of the connecting rod 96 is connected to the other end of the rocker arm 122. As described above, the other end of the connecting rod 96 is connected to the lower end of shaft 90 which extends through and is secured to die lifting block 94.

As noted above, a coil is fed to the slide 32 and, while disposed on the inclined face 30 thereof, is oriented thereon by the positioning fingers 34 and 36 and their associated mechanisms illustrated in FIG. 3 and described above. After the coil has been so oriented, the die 28 is moved upwardly from the position thereof shown in FIG. 1 to effect formation of the coil, the means for reciprocating the die 28 having been just described. The actual coil forming sequence is illustrated in FIGS. 5–8. As the die 28 is moved upwardly along the adjacent face of the anvil 26, the die 28 lifts the coil 1 from the inclined face 30 of the slide 32. As shown in FIGS. 5–8, the working face of the die 28 is provided with a pair of spaced forming blocks 128, the upper edges of which define a shelf which, when the die 28 is moved upwardly, lifts the coil off of the slide 32.

As shown in FIGS. 5–8, the die 28 is bifurcated at its upper end. As the die 28 advances upwardly, the bifurcated end thereof moves astride a blade 130 (as shown in FIG. 6) held in a blade holder 132 (FIG. 4) attached to the anvil 26 and the coil 1 is thus advanced into engagement with said blade. As the die 28 continues its upward movement, the coil is confined within a chamber 129 defined by the spaced forming blocks 128, and the legs thereof being formed are maintained in spaced relationship with respect to one another by the interposed blade 130. As the die 28 near the end of its upward stroke, the bight being formed in the coil is engaged by a pair of spaced setting blocks 134 secured to the die 28 and offset in a vertical plane with respect to the forming blocks 128. As shown in FIGS. 8 and 9, the chamber 135 defined by the spaced setting blocks 134 is narrower than the chamber 129 defined by the spaced forming blocks 128. Thus the upper edge of each of the setting blocks 134 defines a bearing surface for engagement with turns of the coil to define the bight 3 of coil 1. As shown in FIGS. 1 and 4, the anvil 26 is provided with a projecting pin 136 for maintaining spacing of the legs of the formed coil near the free ends thereof as shown in FIG. 8.

With the coil now formed as just described, it is ready for withdrawal from the coil forming apparatus. However, before this can be done, some of the coil forming mechanisms must be displaced to free the coil for withdrawal. Before displacement of these coil forming mechanisms is effected, the formed coil is grasped by a pair of fingers 140 (FIG. 10) depending from a head 142 of a machine with which the coil forming apparatus of this invention is associated. The indexing movement of that machine is so timed with respect to the coil forming operation that as soon as a coil has been formed, a head 142 is advanced into coil-receiving position and the fingers 140 thereof are actuated to grasp the coil as shown in FIG. 10. With the formed coil so held, the die 28 is retracted to a point where the upper edge thereof is below the bight of the formed coil and then the anvil 26 is displaced laterally to remove the blade 130 and the pin 136 thereof from their interposed relationship with respect to the coil. Retraction of the die 28 is effected by the return stroke of the reciprocation of the die by the mechanism illustrated in FIG. 4 and described above.

Figures 11, 12:
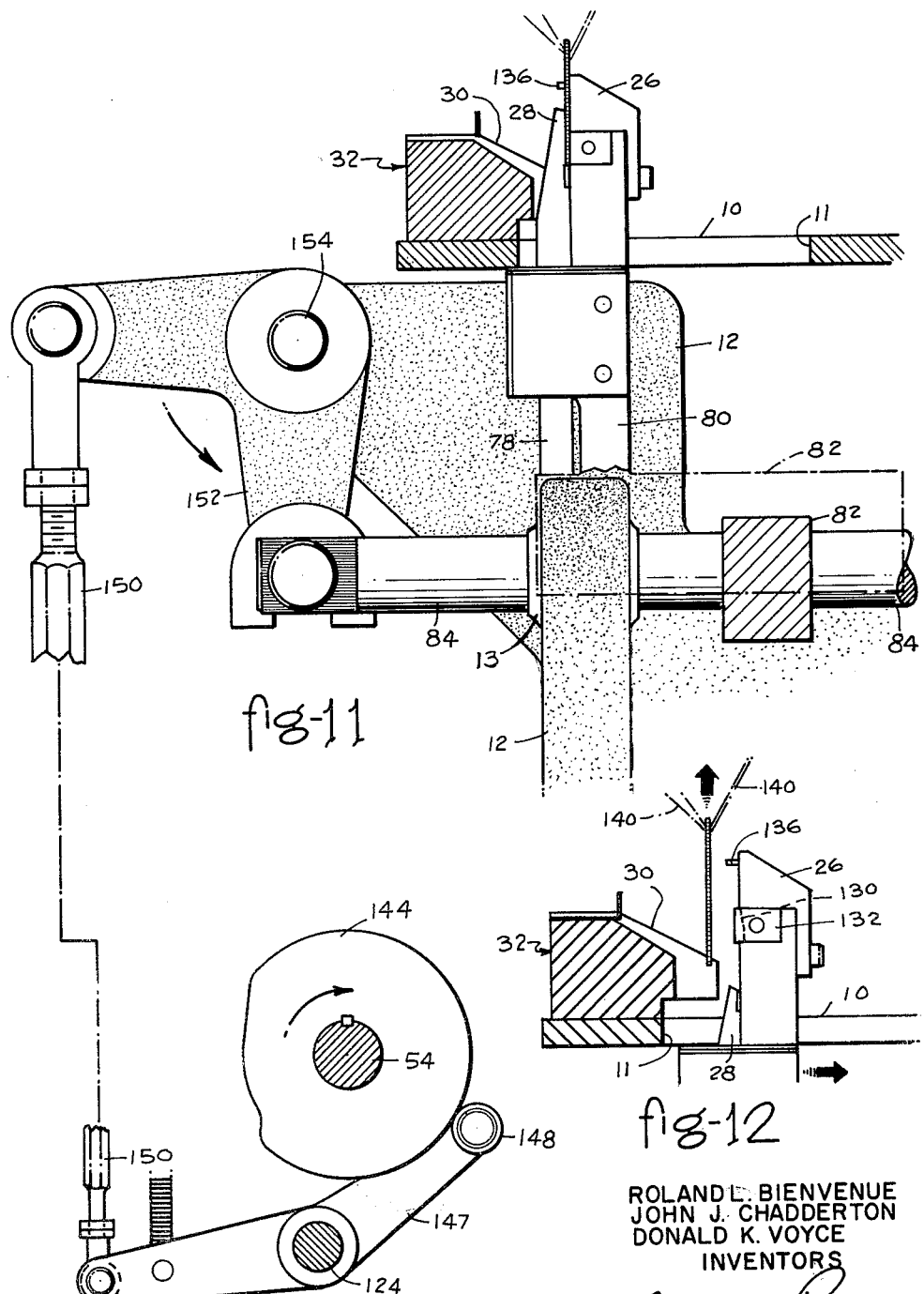
FIG. 11 is an enlarged elevational detail illustrating the means employed to effect lateral displacement of the anvil and its associated parts from the formed coil.
FIG. 12 is a fragmentary detail showing the coil forming tools displaced from the formed coil.

Lateral displacement of the anvil 26 is effected by an anvil cam 144 on drive shaft 54 in FIG. 11. A rocker arm 147, mounted intermediate its ends on rocker arm shaft 124, is provided with a cam follower 148 on one end thereof which rides on cam 144. One end of a connecting rod 150 is connected to the other end of rocker arm 146. The other end of connecting rod 150 is connected to one end of a bell-crank lever 152 which is pivotally mounted intermediate its ends at 154 on bracket 12. One end of the anvil displacement rod 84 is connected to the other end of the bell-crank lever 152. The anvil displacement rod 84 extends through bearing housing 13 formed in bracket 12 and into and through block 82 to which it is secured as described above in connection with FIG. 1. As described above, the anvil 26 is mounted on the top of anvil support 80 and the block 82 is attached to and formed integral with anvil support 80. Thus the anvil cam 144, through the connecting rod 150, bell-crank lever 152 and anvil displacement rod 84 displaces the anvil 26 and its supporting structure laterally to the right from the relative position thereof shown in FIG. 11 to the relative position thereof shown in FIG. 12. As shown in FIG. 12, the die 28 has been withdrawn downwardly and the anvil 26 has been displaced laterally, thus freeing the formed coil held by the fingers 140 which now carry the formed coil away from the coil forming station.

What we claim is:

1. Apparatus for shaping a linear coiled wire having a plurality of coil turns into a hairpin configuration and effecting a spacing of certain coil turns to define a bight, said apparatus comprising: an anvil having a working face; a die having a working face disposed in cooperative relationship with respect to said anvil and the working face thereof; a pair of spaced forming blocks attached to the working face of said die, the adjacent vertical sides of said forming blocks defining a coiled wire leg-receiving pocket and the upper horizontal sides thereof defining a coiled wire receiving shelf; a blade projecting from the working face of said anvil and disposed above and in register with said coiled wire leg-receiving pocket; a pair of spaced setting blocks attached to the working face of said die immediately beneath said pair of spaced forming blocks, the adjacent vertical sides of said setting blocks defining a coiled wire bight-receiving pocket, said pocket being narrower than said coiled wire leg-receiving pocket and the adjacent upper corners of said spaced setting blocks defining stops; means for locating a linear coiled wire on said wire-receiving shelf of said die; and means for effecting relative movement between said die and said anvil along the working faces thereof whereby said blade engages said coiled wire and folds it into said coiled wire leg-receiving pocket into substantially hairpin configuration, said relative movement continuing after the legs of the coiled wire have bottomed on said stops defined by the adjacent upper corners of said spaced setting blocks whereby the spacing between certain coil turns is increased to define the bight of the coiled wire.

2. Apparatus for shaping a linear coiled wire having a plurality of coil turns into a hairpin configuration and effecting a spacing of certain coil turns to define a bight, said apparatus comprising: an anvil having a working face; a die having a working face disposed in cooperative relationship with respect to said anvil and the working face thereof; a pair of spaced forming blocks attached to the working face of said die, the adjacent vertical sides of said forming blocks defining a coiled wire leg-receiving pocket and the upper horizontal sides thereof defining a coiled wire receiving shelf; a blade projecting from the working face of said anvil and disposed above and in register with said coiled wire leg-receiving pocket; a pair of spaced setting blocks attached to the working face of said die immediately beneath said pair of spaced forming blocks, the adjacent vertical sides of said setting blocks defining a coiled wire bight-receiving pocket, said pocket being narrower than said coiled wire leg-receiving pocket and the adjacent upper corners of said spaced setting blocks defining stops; means for locating a linear coiled wire on said wire-receiving shelf of said die; means for effecting relative movement between said die and said anvil along the working faces thereof whereby said blade engages said coiled wire and folds it into said coiled wire leg-receiving pocket into substantially hairpin configuration, said relative movement continuing after the legs of the coiled wire have bottomed on said stops defined by the adjacent upper corners of said spaced setting blocks whereby the spacing between certain coil turns is increased to define the bight of the coiled wire; means for gripping said hairpin coiled wire near the free ends thereof; and means for effecting displacement of said anvil and said die from said hairpin coiled wire held by said gripping means whereby said hairpin coiled wire may be moved from said die-anvil assembly.

3. Apparatus for shaping a linear coiled wire having a plurality of coil turns into a hairpin configuration and effecting a spacing of certain coil turns to define a bight, said apparatus comprising: an anvil having a working face; a die having a working face disposed in cooperative relationship with respect to said anvil and the working face thereof; a pair of spaced forming blocks attached to the working face of said die, the adjacent vertical sides of said forming blocks defining a coiled wire leg-receiving pocket and the upper horizontal sides thereof defining a coiled wire receiving shelf; a blade projecting from the working face of said anvil and disposed above and in register with said coiled wire leg-receiving pocket; a pair of spaced setting blocks attached to the working face of said die immediately beneath said pair of spaced forming blocks, the adjacent vertical sides of said setting blocks defining a coiled wire bight-receiving pocket, said pocket being narrower than said coiled wire leg-receiving pocket and the adjacent upper corners of said spaced setting blocks defining stops; a coiled wire feeding slide; means for orienting said coiled wire on said slide; means for effecting transfer of said oriented coil wire on said feeding slide to said wire-receiving shelf on said die; and means for effecting relative movement between said die and said anvil along the working faces thereof whereby said blade engages said coiled wire and folds it into said coiled wire leg-receiving pocket into substantially hairpin configuration, said relative movement continuing after the legs of the coiled wire have bottomed on said stops defined by the adjacent upper corners of said spaced setting blocks whereby the spacing between certain coil turns is increased to define the bight of the coiled wire.

4. Apparatus for shaping a linear coiled wire having a plurality of coil turns into a hairpin configuration and effecting a spacing of certain coil turns to define a bight, said apparatus comprising: an anvil having a working face; a die having a working face disposed in cooperative relationship with respect to said anvil and the working face thereof; a pair of spaced forming blocks attached to the working face of said die, the adjacent vertical sides of said forming blocks defining a coiled wire leg-receiving pocket and the upper horizontal sides thereof defining a coiled wire receiving shelf; a blade projecting from the working face of said anvil and disposed above and in register with said coiled wire leg-receiving pocket; a pair of spaced setting blocks attached to the working face of said die immediately beneath said pair of spaced forming blocks, the adjacent vertical sides of said setting blocks defining a coiled wire bight-receiving pocket, said pocket being narrower than said coiled wire leg-receiving pocket and the adjacent upper corners of said spaced setting blocks defining stops; a coiled wire feeding slide; means for orienting said coiled wire on said slide; means for effecting transfer of said oriented coiled wire on said feeding slide to said wire-receiving shelf on said die; means for effecting relative movement between said die and said anvil along the working faces thereof whereby said blade engages said coiled wire and folds it into said coiled wire leg-receiving pocket into substantially hairpin configuration, said relative movement continuing after the legs of the coiled wire have bottomed on said stops defined by the adjacent upper corners of said spaced setting blocks whereby the spacing between certain coil turns is increased to define the bight of the coiled wire; means for gripping said hairpin coiled wire near the free ends thereof; and means for effecting displacement of said anvil and said die from said hairpin coiled wire held by said gripping means whereby said hairpin coiled wire may be moved from said die-anvil assembly.

References Cited by the Examiner
UNITED STATES PATENTS

| | | | |
|---|---|---|---|
| 1,309,663 | 7/19 | Smith | 140—87 |
| 1,691,516 | 11/28 | Glore | 140—87 |
| 3,022,804 | 2/62 | Corp | 140—71 |

CHARLES W. LANHAM, *Primary Examiner.*

RICHARD A. WAHL, *Examiner.*